June 15, 1965  R. R. MANDY ETAL  3,188,678
CONTROL ASSEMBLY FOR WINDSHIELD CLEARING SYSTEM
Filed Nov. 15, 1963  4 Sheets-Sheet 1
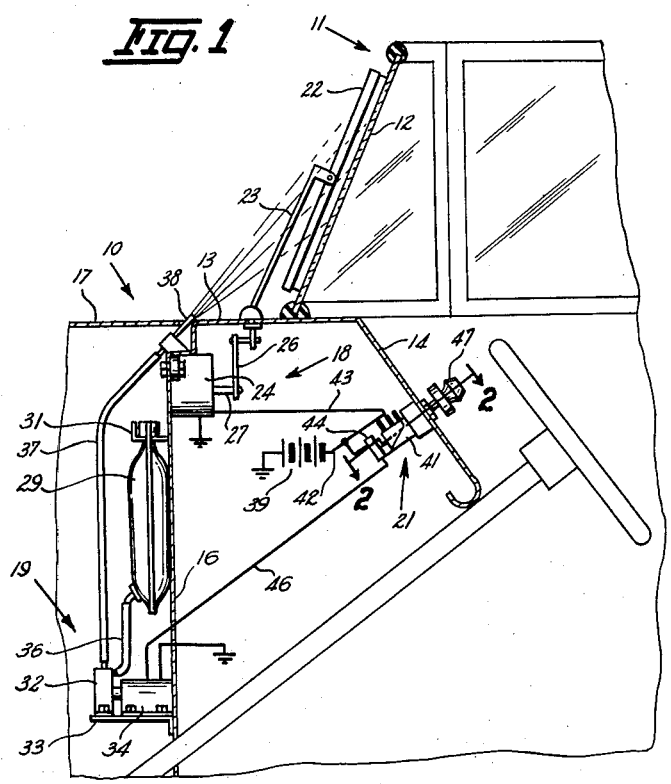
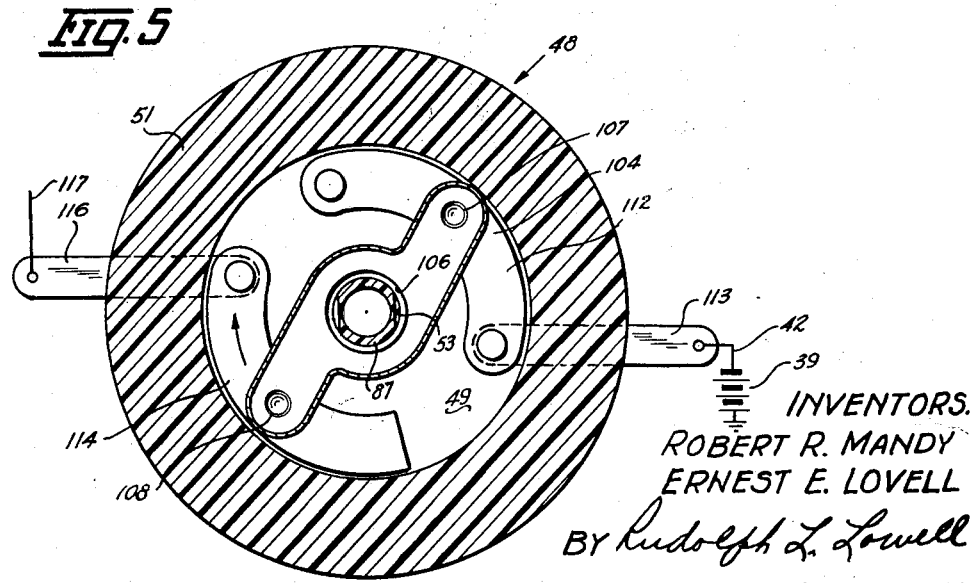
INVENTORS.
ROBERT R. MANDY
ERNEST E. LOVELL
By Rudolph L. Lowell
ATTORNEY.

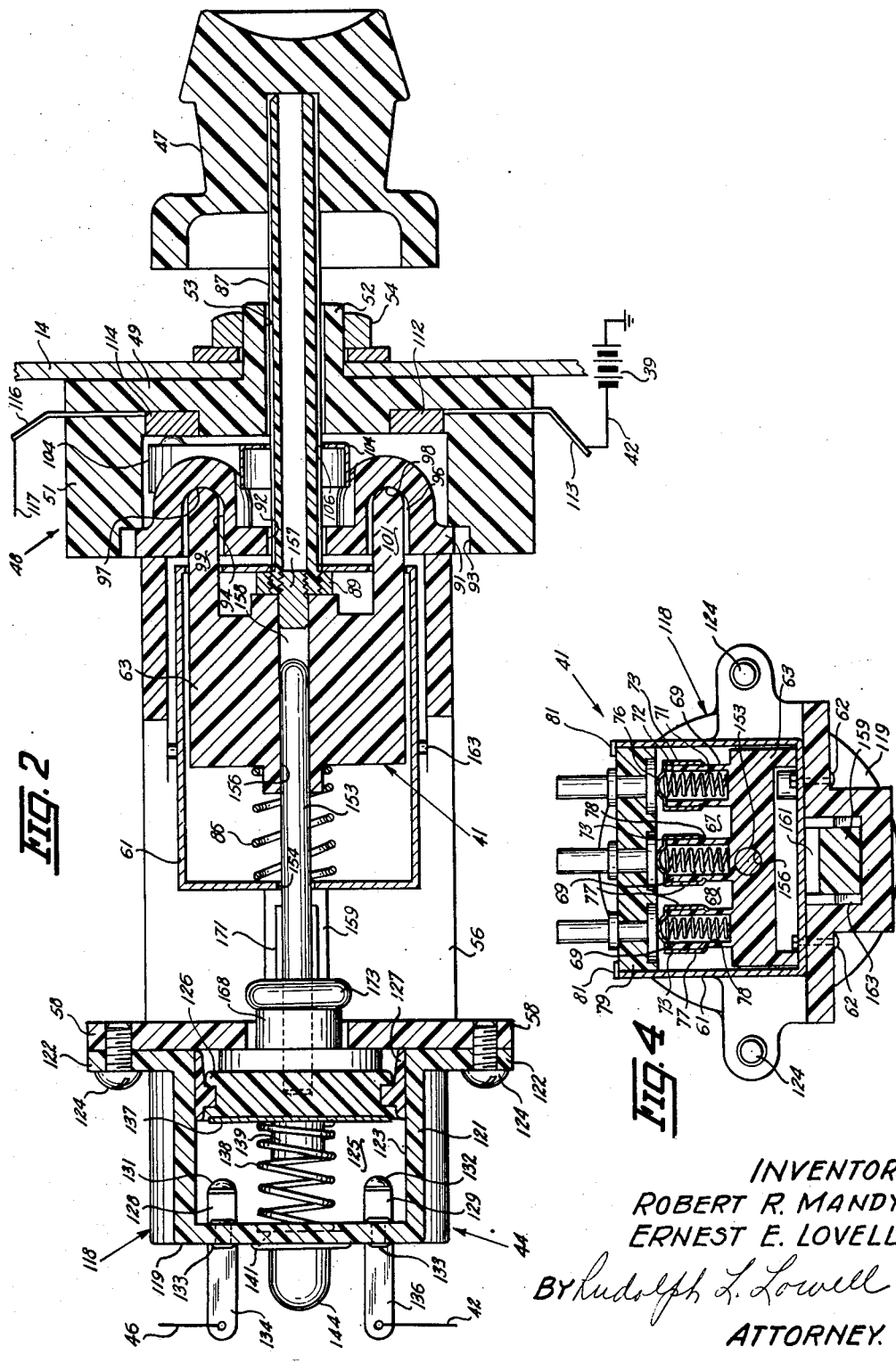

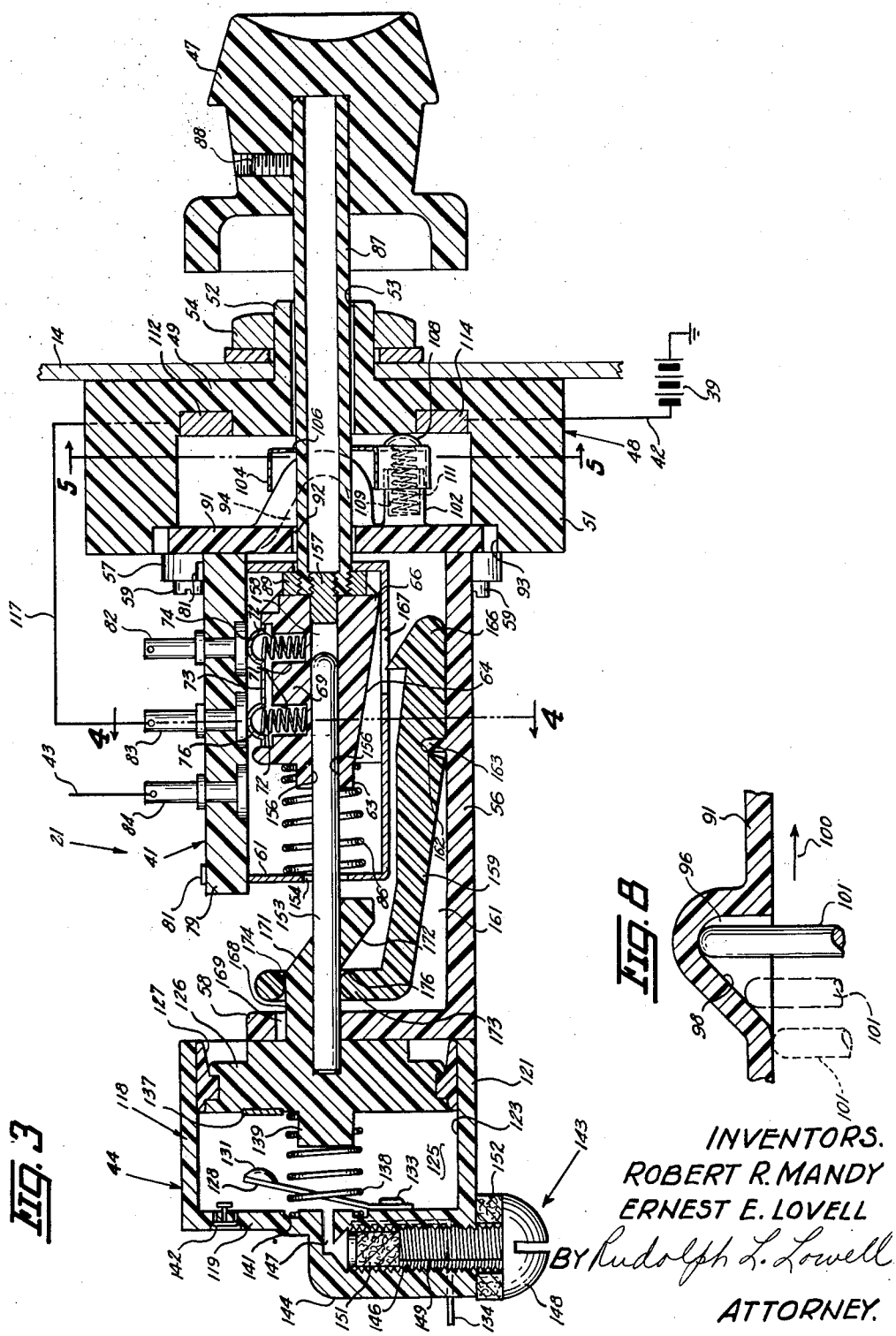

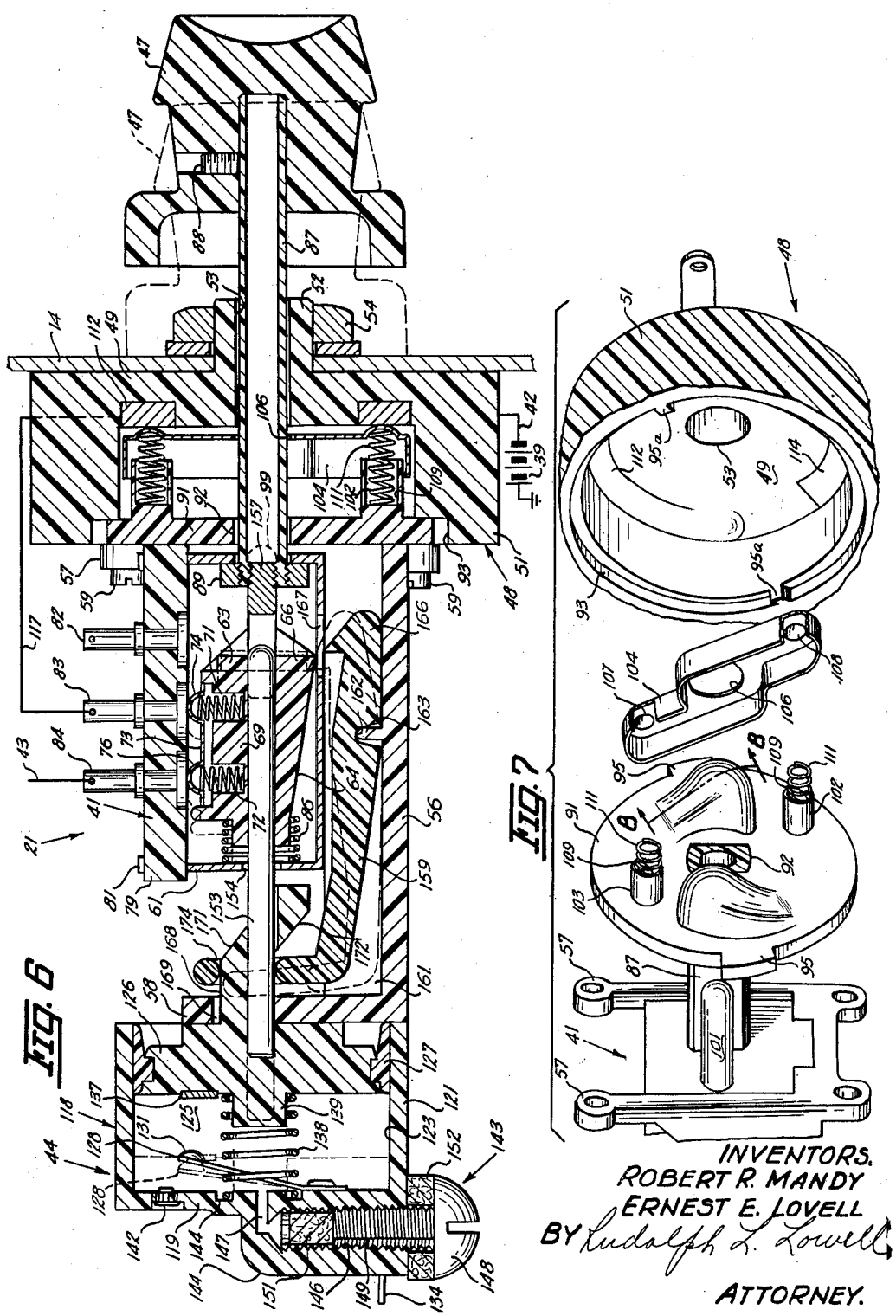

3,188,678
CONTROL ASSEMBLY FOR WINDSHIELD
CLEARING SYSTEM
Robert R. Mandy and Ernest E. Lovell, Detroit, Mich., assignors to The Delman Company, Cookeville, Tenn., a corporation of Tennessee
Filed Nov. 15, 1963, Ser. No. 324,124
8 Claims. (Cl. 15—250.02)

This invention relates to a windshield clearing system having a wiper unit and a washer unit and more particularly to a control assembly providing for the concurrent operation of the wiper unit and the washer unit and for operation of the wiper unit independently of the washer unit.

It is the object of the invention to provide a windshield clearing system having a wiper motor and a washer motor with an improved control assembly which is selectively operable to conjointly connect the wiper motor and washer motor to a source of energy for a predetermined period of time and to independently connect the wiper motor to a source of energy.

Another object of the invention is to provide a control assembly for a wiper motor and a washer motor which has a single manual operator for actuating a wiper switch connecting the wiper motor to a source of energy and for subsequently actuating a washer switch connecting the washer motor to a source of energy.

A further object of the invention is to provide a control assembly having a wiper switch and a washer switch with means for holding each switch in the closed position for different predetermined periods of time with the washer switch being moved to an open position prior to movement of the wiper switch to an open position.

Another object of the invention is to provide a control assembly for a wiper motor and a washer motor of a windshield clearing system which permits the washer motor to be turned on during the operation of the wiper motor without affecting the operation of the wiper motor.

Another object of the invention is to provide a control assembly for a motor operable to connect the motor to a source of energy and to vary the amount of energy supplied to the motor.

An additional object of the invention is to provide a dependable self-contained and compact control assembly for attaining the above mentioned objects which is economical in cost and effective in service and operation.

These and other objects and advantages of this invention will become apparent upon reference to the following description and the annexed drawing, wherein:

FIG. 1 is a fragmentary sectional view of a vehicle equipped with the windshield clearing system of this invention;

FIG. 2 is an enlarged longitudinal sectional view taken along the line 2—2 of FIG. 1 showing the control assembly of the windshield clearing system with the wiper motor and washer motor switches in the "off" position;

FIG. 3 is a longitudinal vertical sectional view of the control assembly of FIG. 2;

FIG. 4 is a sectional view taken along the line 4—4 of FIG. 3;

FIG. 5 is a sectional view taken along the line 5—5 of FIG. 3;

FIG. 6 is a sectional view similar to FIG. 2 showing the wiper motor switch of the control assembly in the "on" position and the washer motor switch in the "off" position;

FIG. 7 is a fragmentary exploded perspective view of the rotatable actuating mechanism for the wiper motor switch; and FIG. 8 is an enlarged sectional detail view taken along the line 8—8 of FIG. 7.

Referring to the drawing, there is shown in FIG. 1 a windshield clearing system indicated generally by the number 10 in assembled relation with a vehicle 11, such as a passenger car, truck, or bus. The vehicle 11 is illustrated as having a windshield 12, an engine cowl 13 extended forwardly of the windshield, and an instrument panel or dashboard 14 positioned below and rearwardly of the windshield 12. A fire wall 16 is integrally joined with the cowl 13 and extends in a downward direction separating the engine cavity from the passenger compartment. A hood 17 forward of the cowl 13 encloses the engine cavity.

The windshield clearing system 10 has two basic components, a wiper unit and a washer unit designated as 18 and 19, respectively. A control assembly 21 mounted on the dash 14 in a position which is convenient to the operator of the vehicle, functions to conjointly operate and actuate the wiper unit 18 with the washer unit 19 or to actuate the wiper unit 18 independently of the washer unit 19.

The wiper unit 18 comprises a pair of wiper elements or blades 22 (one shown) in engagement with the outer surface of the windshield 12. Each element 12 is pivotally connected to an upwardly extended arm 23 which is mounted for pivotal movement on the cowl 13 adjacent the bottom edge of the windshield 12. The wiper elements 22 are oscillated over the windshield 12 by a D.C. electric motor 24 mounted on the fire wall 16 adjacent the cowl 13. A motion transmitting linkage 26 connects the drive shaft 27 of the motor 24 to the arms 23 and functions to change the rotary motion of the drive shaft 24 into oscillating motion for oscillating the arm 23 to move the wiper element 22 over the windshield 12. The speed of the electric motor 22 varies with the current supplied to the motor circuit.

The windshield washer unit 19 has a flexible bag-type fluid container or reservoir 29 mounted on the fire wall 16 by a hook member 31. A fluid pump 32 is positioned below the reservoir 29 and is mounted on a bracket 33 which is secured to the fire wall 16. The pump 32 is driven by a D.C. electric motor 34 which is mounted on the bracket 32 in alignment with the pump. The fluid inlet side of the pump 32 is connected by a hose 36 to the bottom of the reservoir 29 and provides a continuous passage for the flow of windshield cleaning fluid from the reservoir 29 into the pump 32 so that the pump is primed at all times. The fluid outlet of the pump 32 is connected by a hose 37 to a pair of nozzle units 38 (one shown). Each nozzle unit 38 is secured to the upper portion of the fire wall 16 and has a discharge end positioned so as to direct cleaning fluid onto the windshield 12 into the path of movement of the wiper element 22. The wiper motor 24 and the washer motor 34 are operated from the vehicle's battery 39.

The control assembly 21 has a first switch 41 which is connected to the battery 39 by a line 42 and to the motor 24 by a line 43. A second switch 44 is connected to the battery line 42 and to the washer motor 34 by a line 46. The switches 41 and 42 are operative to connect and disconnect the battery with the motors 24 and 34 in response to movement of a manually movable control knob 47. When the knob 47 is rotated the first switch 41 is actuated to connect the battery 39 with the electric motor 24 to operate the wiper unit 18. When the knob 47 is linearly moved toward the dashboard 14 the first switch 41 and the second switch 44 are sequentially actuated to connect the battery 39 with the wiper motor 24 and with the washer motor 34 thereby concurrently operating the washer unit 19 and the wiper unit 18.

Referring to FIGS. 2 and 3, the control assembly 21 comprises a cup-shaped housing 48 having a base wall 49 positioned adjacent the dashboard 14 and a circular side wall 51 extended away from the dashboard. Integral with the base wall 49 is an axial projection 52 having a bore 53. A nut 54 threaded on the projection 52 clamps the housing 48 to the dashboard 14. Positioned adjacent the housing 48 is a longitudinally extended support 56 having upright flanges 57 and 58 at each end. Bolts 59 extend through the flange 57 and are threaded into the circular side wall 51 to fasten the support 56 to the housing 48.

The first switch 41 is positioned on the support 56 adjacent the housing 48 and comprises a box-shaped casing 61 which is secured to the support 56 by bolts 62 (FIG. 4). A contact carrier 63 of electrically insulative material is positioned within the casing 61. The bottom side 64 of the contact carrier 63 tapers inwardly from the forward section of the carrier to form a lip 66 at the bottom edge of the forward section.

As shown in FIG. 4, the top surface of the carrier 63 has a pair of parallel longitudinally extended grooves 67 and 68 which define three upright walls 69. As shown in FIG. 3, each wall 69 has a pair of longitudinally spaced bores 71 for retaining compression springs 72. Positioned over each wall 69 is a U-shaped electrical conductor element 73 having longitudinally spaced spherical projections 74 and 76 which are in alignment with the bores 71 and receive the springs 72. The legs of each conductor element have a tongue 77 which extends into a groove 78 formed in the side of each wall 69. This tongue and groove connection limits the outward movement of the conductor element 73.

A flat cover 79 of electrically insulative material extends over the top of the casing 61 and is retained on the casing by bent tabs 81. As shown in FIG. 3, longitudinally spaced electrical contacts 82, 83, and 84 are mounted in the cover 79 and extend from the inside surface through the outside surface of the cover. The contacts are in alignment with the conductor elements 73 on the contact carrier 63 with the longitudinal distance between adjacent contacts being substantially equal to the longitudinal distance between the projections 74 and 76. The conductor element 73 is biased into engagement with the inside surface of the cover 79 by the compression springs 72 and functions as a movable electrical connector between electrical contacts 82, 83 and 83, 84.

As shown in FIGS. 2 and 3, a compression spring 86 interposed between the casing 61 and the carrier 63 biases the contact carrier 63 to an "off" position wherein the conductor element 73 engages the electrical contacts 82 and 83. The carrier 63 may be moved to an "on" position in response to either a linear movement or a rotational movement of the control knob 47. The knob 47 is mounted on a shaft 87 and is retained thereon by a set screw 88. The shaft 87 has a non-circular cross section and extends through the bore 53 in the housing projection 52 and axially of the housing 48. The end of the shaft 87 engages the forward end of the carrier 63. A collar 89 mounted on the end of the shaft 87, engages the contact carrier 63 and holds the forward end of the shaft in the casing 61. When the control knob 47 is pushed toward the dashboard 14 the shaft 87 will move the contact carrier 63 to the "on" position thereby compressing the spring 86 and providing an electrical connection between the contacts 83 and 84 which connects the battery 39 to the wiper motor 24.

As shown in FIGS. 2 and 3, a disc 91 is slidably mounted on the shaft 87 adjacent the casing 61. The disc 91 has a non-circular central opening 92 which is similar in shape to the cross section of the shaft 87 so that rotation of the shaft 87 rotates the disc 91 relative to the housing 48 (FIG. 7). The outer periphery of the disc 91 extends into a circular groove 93 in the housing side wall 51 thereby preventing the axial movement of the disc 91 into the housing 48. The peripheral wall of the disc 91 has a pair of ears 95 which coact with stop lugs 95a on the housing side wall 51 to limit the rotative movement of the disc 91. As shown in FIG. 2, the disc 91 has a pair of diametrically spaced arcuate cam recesses 94 and 96 which project toward the dashboard 14. The recesses 94 and 96 define cam surfaces 97 and 98 and have an axial depth which is substantially equal to the longitudinal distance between the electrical contacts 82 and 83 on the switch cover 79. The contact carrier 63 engages the disc 91 by a pair of axially extended legs 99 and 101 which extend through the casing 61 into the cam recesses 94 and 96. Rotation of the control knob 47 in a clockwise direction indicated by arrow 100 in FIG. 8, turns the disc 91 so that the legs 99 and 101 ride up the cam surfaces 97 and 98 to axially move the contact carrier to an "on" position compressing the spring 86. The contact carrier 63 is held in the "on" position by the disc 91 until the disc 91 is rotated to a position wherein the legs 99 and 101 are in alignment with the recesses 94 and 96. The compression spring 86 moves the contact carrier 63 back to the "off" position and the legs 99 and 101 into the recesses 94 and 96.

Integrally formed with the disc 91 are a pair of bosses 102 and 103 which are diametrically spaced from each other and extend in an axial direction toward the dashboard 14. As shown in FIG. 7, a bridge element 104 having a channel-shaped cross section and a central opening 106 for the shaft 87 is carried by the bosses 102 and 103. Each end of the bridge element 104 has an axial projection 107 and 108. Each of the bosses 102 and 103 has an axial bore 109 into which is interposed a compression spring 111. One end of each spring 111 engages the bridge element 104 whereby to bias the bridge element toward the base wall 49.

As shown in FIG. 5, an arcuate contact 112 is secured in the base wall 49 and has a terminal 113 at one end projected from the housing 48 and connected to the battery line 42. An arcuate electrical resistor element 114 is secured in the housing base wall 49 diametrically opposite the contact 112. The end of the resistor element 114 opposite the terminal 113 has an electrical connector 116 which is coupled to the contact 83 by a line 117. The projections 107 and 108 of the bridge element 104 are in sliding engagement with the arcuate contact 112 and the arcuate resistor element 114, respectively. Rotation of the disc 91 moves the contact point between the bridge element 104 and the resistor element 114 relative to the connector 116. As the bridge element projection 108 is moved toward the connector 116 in the direction of the arrow shown in FIG. 5 the resistance in the circuit to the motor 24 is decreased resulting in the increased speed of operation of the motor 24.

As shown in FIGS. 2 and 3, the second switch 44 comprises a cylindrical housing 118 having an end wall 119, a side wall 121 with lateral ears 122, and a cylindrical bore 123 defining a chamber 125. Bolts 124 extend through the ears 122 into the support flange 58 to mount the housing 118 on the support 56 with the bore 123 in axial alignment with the shaft 87. Positioned in the bore 123 is a piston 126 having an annular seal 127 in engagement with the inner surface of the side wall 121.

As shown in FIG. 2, a pair of leaf springs 128 and 129 having electrical contacts 131 and 132, respectively, integral with the upper end of each spring are positioned within the chamber 125 defined by the bore 123. The lower end of each leaf spring is secured to the end wall 119 by rivets 133 which also secure the connectors 134 and 136 to the wall 119. Secured to the inside face of the piston 126 is a contact element 137 which has a length sufficient to simultaneously engage the contacts 131 and 132 on the leaf springs 128 and 129. When the piston 126 is moved toward the end wall 119 the contacts 131 and 132 engage the contact element 137 thereby connecting the battery 39 to the washer motor 34.

A compression spring 138 axially extended between the end wall 119 and the piston 126 biases the piston into engagement with the support flange 58. An integral boss 139 on the central portion of the piston 126 and an annular groove 141 in the end wall 119 maintain the spring 138 in axial alignment with the piston 126 and out of engagement with the leaf springs 128 and 129.

The rate of movement of the piston 126 toward the support flange 58 is determined by the rate of air flowing into the chamber 125 formed by the bore 123 and the piston 126. When the piston 126 is moved toward the end wall 119 the air in the chamber 125 moves through a check valve 142 mounted in the end wall 119. Check valve 142 functions to allow air to flow from the chamber 125 and prevents air from flowing into the chamber 125. The flow of air into the chamber 125 is adjustably controlled by an air bleed valve unit 143. This bleed unit 143 comprises a housing 144 that is integrally formed with the end wall 119 and has a threaded bore 146 which joins with a passage 147 opening into the chamber 125. A bleed screw 148 having a flat side 149 is threaded into the bore 146 to compress filter material 151 positioned in the bottom of the bore 146 and a washer of filter material 152 positioned beneath the head of the screw 148. The filter material 151 and 152 may be of a felt composition and allows air to flow along the flat side 149 of the screw and through the passage 147 into the chamber 125. The rate of air flow through the filter material is adjusted by turning the screw 148 into and out of the bore 146.

As shown in FIGS. 2 and 3, the piston 126 is secured to a shaft 153 which extends through an opening 154 in the casing 61 and into a bore 156 in the carrier 63. The shaft 153 is slidable in the bore 156 thereby enabling the carrier 63 to move independently of the movement of the shaft 153. A short plug 157 is secured to the shaft 87 adjacent the collar 89 and extends in an axial direction into the bore 156. When the control knob 47 is pushed toward the dashboard 14 the shaft 87 moves the plug 157 into engagement with the end of the shaft 153 thereby transmitting a pushing force to the piston 126. The space 158 between the plug 157 and the end of the shaft 153 provides for the initial movement of the contact carrier 63 toward its "on" position prior to the movement of the piston 126 toward the end wall 119 whereby the first switch 41 is moved to the "on" position before the second switch 44 is moved to the "on" position.

As shown in FIG. 3, a latch 159 extends longitudinally of and under the casing 61 within a groove 161 formed in the support 56. The latch 159 comprises a lever having a transverse recess 162 cooperating with a transverse rib 163 positioned across the groove of the support 56 so as to fulcrum the lever for pivotal movement about a transverse axis. That end of the latch 159 which is below the carrier 63 has an upwardly projected step section 166 in registration with an opening 167 in the casing 61. As shown in FIG. 6 in broken lines the step section 166 engages the lip 66 of the carrier 63 so as to hold the carrier in the "on" position.

The angular position of the latch 159 is determined by the position of the piston 126 in the bore 123. As shown in FIG. 3, the piston 126 has a section 168 which extends axially along the shaft 153 toward the dashboard 14 through an opening 169 in the support flange 58. The extension 168 has forwardly and downwardly inclined top and bottom cam surfaces 171 and 172. The end of the latch 159 adjacent the axial extension 168 has an upright tail 173 formed with an opening 174 for receiving the extension 68. The cam surface 171 engages the top portion of the opening 174 and the cam surface 172 engages the bottom surface of the opening 174 so that upon axial movement of the extension 168 the latch 159 will pivot on the rib 163 whereby to move the step section 166 into and out of engagement with the lip 66 of the contact carrier 63.

In use, and when it is desired to operate the wiper unit 18 independently of the washer unit 19, the operator of the vehicle rotates the control knob 47 in a clockwise direction. As shown in FIGS. 2 and 3, the shaft 87 connects the knob 47 and the disc 91 so that clockwise rotation of the knob 47 rotates the disc 91 in a clockwise direction. As illustrated in FIG. 2, the disc 91 has a pair of diametrically opposed arcuate recesses 94 and 96 which define inclined cam surfaces 97 and 98. The leg members 99 and 101 of the contact carrier 63 are positioned in the recesses 94 and 96 and engage the cam surfaces 97 and 98. Rotation of the disc 91 moves the inclined cam surfaces 97 and 98 relative to the legs 99 and 101 thereby moving the contact carrier 63 to the "on" position and compressing the spring 86 (FIG. 8).

As shown in FIG. 6, the disc 91 retains the contact carrier 63 in the "on" position wherein the conductor element 73 electrically couples the contacts 83 and 84 to close the electrical circuit to the electric motor 24.

The rotational speed of the electric motor 24 is controlled by a resistance element 114 positioned in the base wall 49 of the cup-shaped housing 48. The battery 39 is connected by a line 42 to an arcuate contact 112 which is positioned in the base wall 49 of the housing 48. The bridge element 104 is carried by the disc 91 by a pair of bosses 102 and 103 which form part of the disc 91 and are biased toward the base wall 49 by springs 111. As shown in FIG. 5, when the disc 91 is rotated in a clockwise direction the bridge element 104 will move toward the resistor connector 116 thereby decreasing the amount of resistance in the electrical circuit to the motor 24. Varying the resistance in the electric circuit of motor 24 varies the speed of rotation of the motor and in turn the rate of movement of the wiper element 22 relative to the windshield 12.

In order to terminate the operation of the wiper unit 18 the control knob 47 is rotated in a counterclockwise direction until the arcuate recesses 94 and 96 in the discs 91 are in registration with the legs 99 and 101 of the contact carrier 63. The spring 86 biases the contact carrier 63 to the "off" position into engagement with the collar 89 on the shaft 87. With the rotation of the disc 91 in a counterclockwise direction the bridge element 104 will be moved to the position illustrated in FIG. 5. This increases the resistance in the electrical circuit to the motor 24 so that the motor will be returned to a slow speed operation prior to the opening of its electrical circuit.

In the conjoint operation of the wiper unit 18 with the washer unit 19 the operator of the vehicle pushes the control knob 47 toward the dashboard 14. The collar 89 on the shaft 87, being in engagement with the contact carrier 63, moves the carrier to the "on" position against the pressure of the spring 89. After the initial movement of the shaft 87 the plug 157 engages the end of the shaft 153. Continued linear movement of the control knob 47 toward the dash 14 moves the piston 126 into the bore 123. As the piston 126 moves into the bore 123, the contact element 137 moves toward the contacts 131 and 132 on the leaf springs 128 and 129, respectively. As shown in FIG. 6, when the axial boss 139 of the piston 126 engages the end wall 119 the contact element 136 is in engagement with the contacts 131 and 132 so as to electrically couple the battery 36 with the washer electric motor 34.

As shown in broken lines in FIG. 6, the contact carrier 63 is in engagement with the casing 61 and the projections 74 and 76 of the conductor element 73 are in contact with the forward edges of the electrical contacts 83 and 84. When the contact carrier 63 has been moved into engagement with the end wall of the casing 61 the boss 139 of the piston 126 engages the housing end wall 119 forcing the air in the chamber 125 out through the check valve 142. When the piston 126 moves into the chamber 123 the cam surface 172 engages the cam follower surface 176 of the latch 159. Continued movement of the piston 126 pivots the latch 159 about the fulcrum rib 163 and moves the stepped head section 166 of the latch into the path of movement of the contact carrier 63. The stepped head section 166 of the latch engages the lip 66 of the contact carrier 63 to hold the contact carrier in the "on" position. This position is maintained until the latch 159 is released.

The spring 138 biases the piston 126 away from the end wall 119. The rate of movement of the piston out of the bore 123 is controlled by the air bleed 143 which regulates the rate of flow of air into the chamber 125. As the piston 126 moves out of the bore 123 toward the support flange 58 the contact element 137 is moved away from the electrical contacts 131 and 132. The leaf springs 128 and 129 move the contacts 131 and 132 along with the piston 126 for a limited distance which is determined by the angular position of the leaf springs with respect to the end wall 119. Continued movement of the piston 126 out of the bore 123 breaks the electrical connection between the contact element 137 and the contacts 131 and 132 thereby opening the circuit to the washer motor 34.

The latch 159 maintains the contact carrier 63 in the "on" position so that the wiper unit will continue to operate after the washer unit has stopped operating. Thus the wiper element 22 will clear the windshield 12 of cleaning fluid.

When the cam surface 171 engages the cam follower surface 174 movement of the piston 126 out of the bore 123 rotates the latch 159 about the fulcrum rib 163 to move the stepped head section 166 downwardly out of engagement with the lip 66. As soon as the latch 159 is released from the contact carrier 63 the spring 86 will bias the carrier 63 to the "off" position. Thus the wiper unit 18 will automatically stop operating a predetermined time after the washer motor 34 has been turned off.

During the conjoint operation of the wiper unit 18 with the washer unit 19 the rotational speed of the wiper motor 24 may be increased merely by rotating the control knob 47 which results in a decrease in the amount of resistance in the electric circuit to the motor 24. When the control knob 47 is rotated in a clockwise direction the bridge element 104 as shown in FIG. 5 is moved toward the connector 116 thereby decreasing the effective length of the resistor element 114 with a resultant increase in speed of the motor 24. In order to stop the operation of the wiper 18 the control knob 47 must be rotated back until the recesses 94 and 96 of the disc 91 are in registration with the legs 99 and 101 of the contact carrier 63. In this position the wiper electric motor 24 is running at a slow speed.

In summary, the windshield clearing system 10 has a wiper unit 18 and a washer unit 19 and a common control assembly 21 which provides for operation of the wiper unit 18 independently of the washer unit 19 and for the concurrent operation of the wiper unit and the washer unit.

In the concurrent operation of the wiper unit 18 and the washer unit 19 the first switch 41 is manually actuated to connect the wiper motor 24 to a source of energy thereby moving the wiper element 22 over the surface of the windshield 12. Subsequently the second switch 44 is manually actuated to connect the washer motor 34 to a source of energy. The washer motor 34 operates to drive a pump 32 which withdraws cleaning fluid from the reservoir 29 and discharges cleaning fluid under pressure to nozzle units which direct the cleaning fluid onto the windshield 12 into the path of movement of the wiper element 22. This washing action is commenced after the wiper elements have completed a number of wiping strokes.

The conjoint operation of the wiper unit 18 with the washer unit 19 will continue as long as manual force is applied to the control knob 47. When the control knob 47 is released the second switch 44 is opened after a predetermined time which is controlled by an air bleed unit 143. With the second switch 44 open the washer motor is deenergized resulting in the termination of the discharge of cleaning fluid onto the windshield 12. The wiper unit 18 will continue to operate as the first switch 41 is held in the "on" position for a predetermined time after the second switch 44 has been opened. This time may also be adjusted by the air bleed unit 143 which controls the rate of movement of the piston 126 to its return or rest position.

Although there have been shown, described, and pointed out the fundamental novel features of the invention, it will be understood that various omissions, substitutions, changes in form, and details of the windshield clearing system illustrated may be made by those skilled in the art without departing from the scope of the invention as defined in the appended claims.

We claim:
1. A windshield clearing system for a vehicle having a windshield and a wiper element positioned on said windshield comprising:
 (a) a washer unit including first motor means operable to dispense fluid against the windshield,
 (b) second motor means for oscillating the wiper over the windshield,
 (c) circuit means including a first switch for energizing said first motor means and a second switch for energizing said second motor means,
 (d) said second switch having a contact carrier biased toward a first position wherein said second switch is open and movable to a second position wherein said second switch is closed,
 (e) latch means engageable with said carrier to hold said carrier in the second position and movable from said carrier whereby said carrier is biased toward the first position, and
 (f) control means operatively connected to said first switch and said latch means, said control means movable to a first position to close said first switch and to hold said latch means in engagement with said carrier, and movable from the first position to the second position to open said first switch and subsequently move said latch means from said carrier thereby permitting said carrier to be biased to the first position to open said second switch after the cessation of the dispensing of fluid onto the windshield.

2. The windshield clearing system defined in claim 1 wherein said control means includes:
 (a) cylinder means,
 (b) piston means slidably disposed in said cylinder means for movement between first and second positions,
 (c) cam means connected to said piston means and engageable with said latch means to hold said latch means in engagement with said carrier when said piston means is in said second position,
 (d) means biasing the piston means toward said first position,
 (e) check valve means connected to said cylinder means to control the flow of air from the cylinder means when the piston means is moved to the second position, and
 (f) adjustable air bleed means for regulating the flow of air into the cylinder means when the piston means is moved to the first position.

3. A control assembly operable to connect a first electric motor and a second electric motor to a source of electric energy comprising:
 (a) a first switch means having a contact carrier biased to a first position wherein said first switch means is open and movable to a second position wherein said first switch means is closed to connect the first electric motor to the source of energy,
 (b) a second switch means operable to connect and disconnect the second motor to the source of energy, (c) shaft means operatively connected to said contact carrier and said second switch means, said shaft means mounted for linear movement and engageable with said carrier and second switch means whereby upon linear movement of the shaft means the contact carrier is moved from the first position to the second position to connect the first motor to the source of energy and the second switch means is subsequently actuated to connect the second motor to the source of energy, (d) latch means engageable with said contact carrier to hold said contact carrier in the second position and movable from said contact carrier whereby said contact carrier is biased toward the first position, and (e) cam means mounted on said shaft means and engageable with said latch means, said cam means on linear movement of the shaft means in a first direction to close the first switch and second switch is acting to hold the latch means in engagement with said carrier, and on movement in an opposite direction acting to move said latch means from said carrier.

4. The control assembly defined in claim 3 including:
(a) means for controlling the rate of movement of the cam means in said opposite direction including,
(b) cylinder means,
(c) piston means slidably disposed in said cylinder means and secured to said cam means,
(d) means biasing the piston means in said opposite direction,
(e) check valve means operative to control the air flow from said cylinder means, and
(f) an adjustable air bleed valve for regulating the flow of air into the cylinder means when the piston means is moving in said opposite direction.

5. The control assembly defined in claim 3 including:
(a) disc means mounted on said shaft means for rotation therewith adjacent said first switch means, and
(b) coacting portions on said disc means and contact carrier operable upon rotation of said disc means to move the carrier to the second position to connect the first motor to the source of energy.

6. A control assembly operable to connect an electric motor and a source of electric energy comprising:
(a) switch means having a contact carrier biased to a first position wherein said switch means is open and movable to a second position wherein said switch means is closed,
(b) shaft means mounted for rotational and linear movement, said shaft means engageable with said carrier whereby upon linear movement of the shaft means the carrier is moved from the first position to the second position,
(c) disc means mounted on said shaft means for rotation therewith, and
(d) coacting means on said disc means and contact carrier operable upon rotation of said disc means to move the carrier from the first position to the second position.

7. A control assembly operable to connect an electric motor and a source of electric energy comprising:
(a) housing means,
(b) switch means having a contact carrier biased to a first position wherein said switch means is open and movable to a second position wherein said switch means is closed,
(c) a shaft mounted in said housing means for rotational and linear movement, said shaft engageable with said carrier whereby upon linear movement of the shaft means the carrier is moved from the first position to the second position,
(d) disc means mounted on said shaft for rotation therewith adjacent said switch means, said disc means having recesses defining cam surfaces facing the contact carrier of the switch means, and
(e) leg means secured to said carrier and extended into the recesses of the disc means whereby upon rotation of said disc means the contact carrier is moved to the second position to connect the motor with the source of energy.

8. The control assembly defined in claim 7 including:
(a) variable resistor means operably connected to said disc means for changing the resistance of the electrical circuit between the source of energy and the motor whereby the speed of the motor is determined by the angular position of the disc means relative to the housing means.

References Cited by the Examiner

UNITED STATES PATENTS

| | | | |
|---|---|---|---|
| 1,200,460 | 10/16 | Booraen | 200—16 |
| 2,162,985 | 6/39 | West | 15—250.02 |
| 2,905,962 | 9/59 | Ziegler | 15—250.02 |
| 2,992,448 | 7/61 | Simpson | 15—250.12 |

CHARLES A. WILLMUTH, *Primary Examiner.*